(12) United States Patent
Narabu

(10) Patent No.: US 7,639,293 B2
(45) Date of Patent: Dec. 29, 2009

(54) IMAGING APPARATUS AND IMAGING METHOD

(75) Inventor: Tadakuni Narabu, Kanagawa (JP)

(73) Assignee: Sony Corporation, Tokyo (JP)

( * ) Notice: Subject to any disclaimer, the term of this patent is extended or adjusted under 35 U.S.C. 154(b) by 559 days.

(21) Appl. No.: 11/208,377

(22) Filed: Aug. 19, 2005

(65) Prior Publication Data

US 2006/0038909 A1      Feb. 23, 2006

(30) Foreign Application Priority Data

Aug. 20, 2004   (JP) ............................. P2004-240605

(51) Int. Cl.
*H04N 9/093*   (2006.01)
*G06K 9/32*    (2006.01)

(52) U.S. Cl. ................. 348/263; 348/345; 382/294

(58) Field of Classification Search ................ 348/373, 348/376, 333.12, 340, 336, 375; 359/464
See application file for complete search history.

(56) References Cited

U.S. PATENT DOCUMENTS

| | | | |
|---|---|---|---|
| 4,680,466 A * | 7/1987 | Kuwahara et al. ...... 250/231.14 |
| 5,453,784 A * | 9/1995 | Krishnan et al. ............ 348/348 |
| 7,157,690 B2 * | 1/2007 | Nishiwaki et al. ........... 250/226 |
| 7,196,728 B2 * | 3/2007 | Campbell et al. ........... 348/340 |
| 2003/0063783 A1* | 4/2003 | Higuchi ..................... 382/125 |
| 2004/0238731 A1* | 12/2004 | Nishiyama et al. .......... 250/234 |
| 2006/0001967 A1* | 1/2006 | Techakumpuch et al. ... 359/464 |

OTHER PUBLICATIONS

"Light Field Camera Design for Integral View Photography" by Georgeiv & Intwala, 2003.*

* cited by examiner

*Primary Examiner*—Lin Ye
*Assistant Examiner*—Euel K Cowan
(74) *Attorney, Agent, or Firm*—Sonnenschein Nath & Rosenthal LLP

(57) ABSTRACT

Subject images are formed on the image surface of an imaging device through a number of holes formed in a light shielding part arranged opposite to the image surface of the imaging device. Electric signals produced from the subject images on the image surface by photoelectric conversion through the imaging device are subjected to signal processing by a signal processing circuit to correct the displacement between the subject images formed on the image surface through the holes.

3 Claims, 6 Drawing Sheets

IMAGING APPARATUS AND IMAGING METHOD

CROSS PREFERENCE TO RELATED APPLICATIONS

The present application claims the benefit of Japanese Patent Application JP 2004-240605 filed in the Japanese Patent Office on Aug. 20, 2004, the entire contents of which are incorporated herein by reference.

FIELD OF THE INVENTION

The present invention relates to an imaging apparatus and an imaging method, and more particularly, it relates to an imaging apparatus using an imaging device for converting subject images formed on an image surface into electric signals and an imaging method of the imaging apparatus.

BACKGROUND OF THE INVENTION

As an imaging apparatus, a pinhole camera is well-known. According to the pinhole camera, a subject image is formed on a photosensitive material such as a film in a dark box through a hole, called a pinhole, formed on one plane of the dark box. In the case of the pinhole camera, slight light passing through the pinhole reaches one point on the photosensitive material. Therefore, the amount of light is small. In image capturing under low light conditions, the pinhole camera is of little practical use.

Accordingly, a conventional common imaging apparatus includes an imaging lens 101. As shown in FIG. 6, the apparatus has a structure in which an imaging device 102 is arranged in the focal position of the imaging lens 101. Image light from a subject captured by the imaging lens 101 is subjected to optical processing through an optical system 103 so that the imaging device 102 converts the light into electric signals. An image is formed on the image surface of the imaging device 102. Electric signals that are produced from the subject image on the image surface by photoelectric conversion through the imaging device 102 are subjected to predetermined signal processing through a signal processing circuit 104 arranged downstream of the imaging device 102.

This type of imaging apparatus has been used by itself as a digital still camera. In addition, the imaging apparatus has recently been being incorporated into compact portable devices such as mobile phones. Reducing the size, weight, and cost of the imaging apparatus is desired in incorporating the apparatus into a mobile phone. In other words, the use of a small-sized, lightweight, and low-cost imaging apparatus contributes to the reduced size, weight, and cost of a compact portable device such as a mobile phone.

In the imaging apparatus using the imaging lens 101, however, the size of the apparatus is increased by the amount corresponding to the size of the imaging lens 101, the weight thereof is increased by the amount corresponding to the weight of the imaging lens 101, and further, the cost thereof is increased by the amount corresponding to the cost of the imaging lens 101. In addition, the amount of ambient light is reduced due to shading of the imaging lens 101. In shooting a subject with a wide dynamic range, the difference in signal charge between pixels of the imaging device 102 is large. Therefore, it is desired to design the imaging device 102 so as to provide a wide dynamic range.

Methods and devices consistent with the present invention are made in consideration of the above problems and to provide an imaging apparatus which does not need the conventional lens, thereby achieving a reduction in size, weight, and cost.

SUMMARY OF THE INVENTION

According to one embodiment of the present invention, there is provided an imaging apparatus that has a structure in which subject images are formed on the image surface of an imaging device through a plurality of holes formed in a light shielding part arranged opposite to the image surface, and electric signals, obtained from the subject images on the image surface by photoelectric conversion through the imaging device, are subjected to signal processing to correct the displacement between the subject images formed on the image surface.

DESCRIPTION OF THE PREFERRED EMBODIMENTS

An embodiment of the present invention will now be described in detail below with reference to the drawings.

Figure 1:
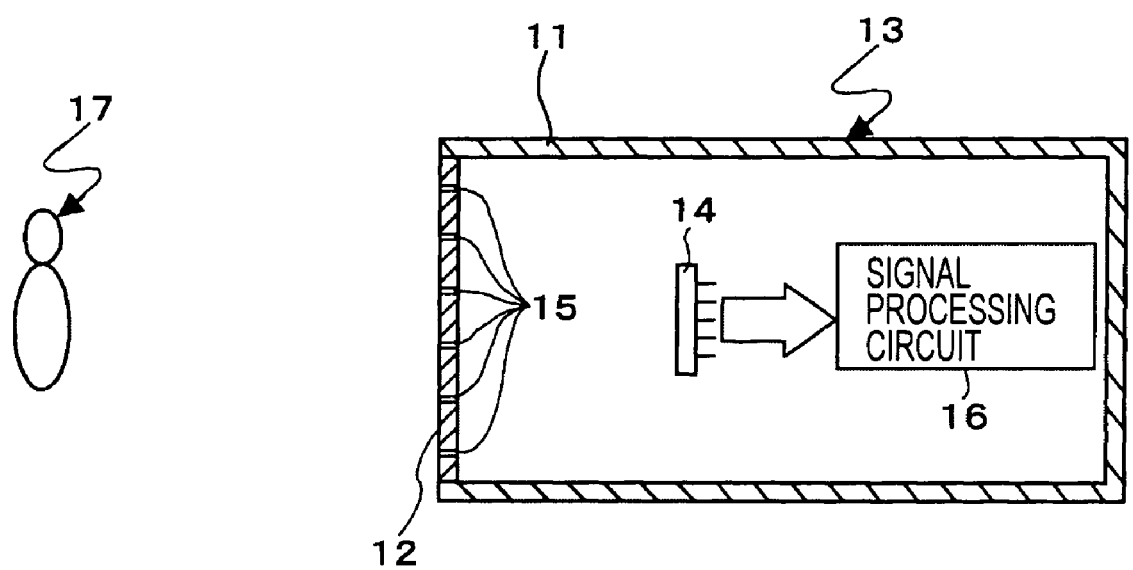
FIG. 1 is a diagram of the structure of an imaging apparatus according to an embodiment of the present invention.

FIG. 1 is a diagram of the structure of an imaging apparatus according to one embodiment of the present invention. Referring to FIG. 1, a light shielding part 12 is arranged at the opening of a casing 11, thus forming a dark box 13. An imaging device 14 is arranged in the dark box 13.

The imaging device 14 includes a device for photoelectric conversion of pixels, such as a charge-transfer imaging device typified by a charge coupled device (CCD) imager, or an XY-addressable imaging device typified by a metal oxide semiconductor (MOS) imager.

In the light shielding part 12, a plurality of holes 15 called pinholes are formed as much as, e.g., the number of pixels of the imaging device 14. Light from a subject 17 passes through the holes 15, thus forming subject images on the image surface of the imaging device 14.

The imaging device 14 converts each subject image formed on the image surface into electric signals at the pixels and generates the electric signals. A signal processing circuit 16 is arranged downstream of the imaging device 14. The signal processing circuit 16 processes the electric signals generated from the imaging device 14 to correct the displacement between the subject images formed through the holes 15 on the image surface of the imaging device 14. The signal processing is described in detail below.

The imaging principle of the imaging apparatus with the above structure consistent with the present embodiment will now be described.

Light from the subject 17 is guided into the dark box 13 through the holes (pinholes) 15 in the light shielding part 12. At that time, each hole 15 forms a subject image on the image surface of the imaging device 14. In this instance, the subject images corresponding to the number of holes 15 that are formed on the image surface of the imaging device 14. Consequently, the amount of light corresponding to the number of formed subject images, i.e., the number of holes 15, is obtained on the whole image surface.

Figure 2:
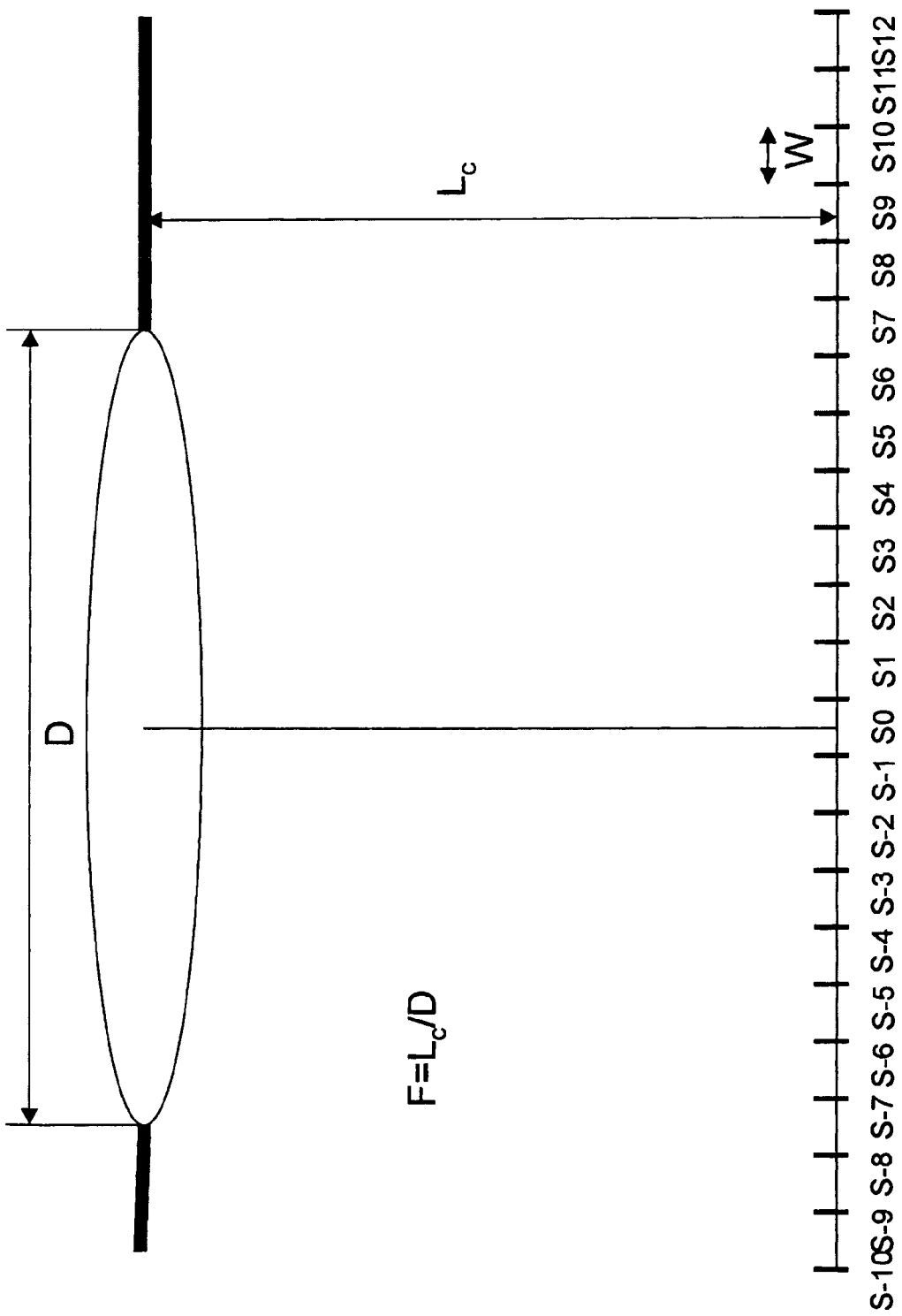
FIG. 2 is a diagram of a conventional optical system using a lens.
Figure 3:
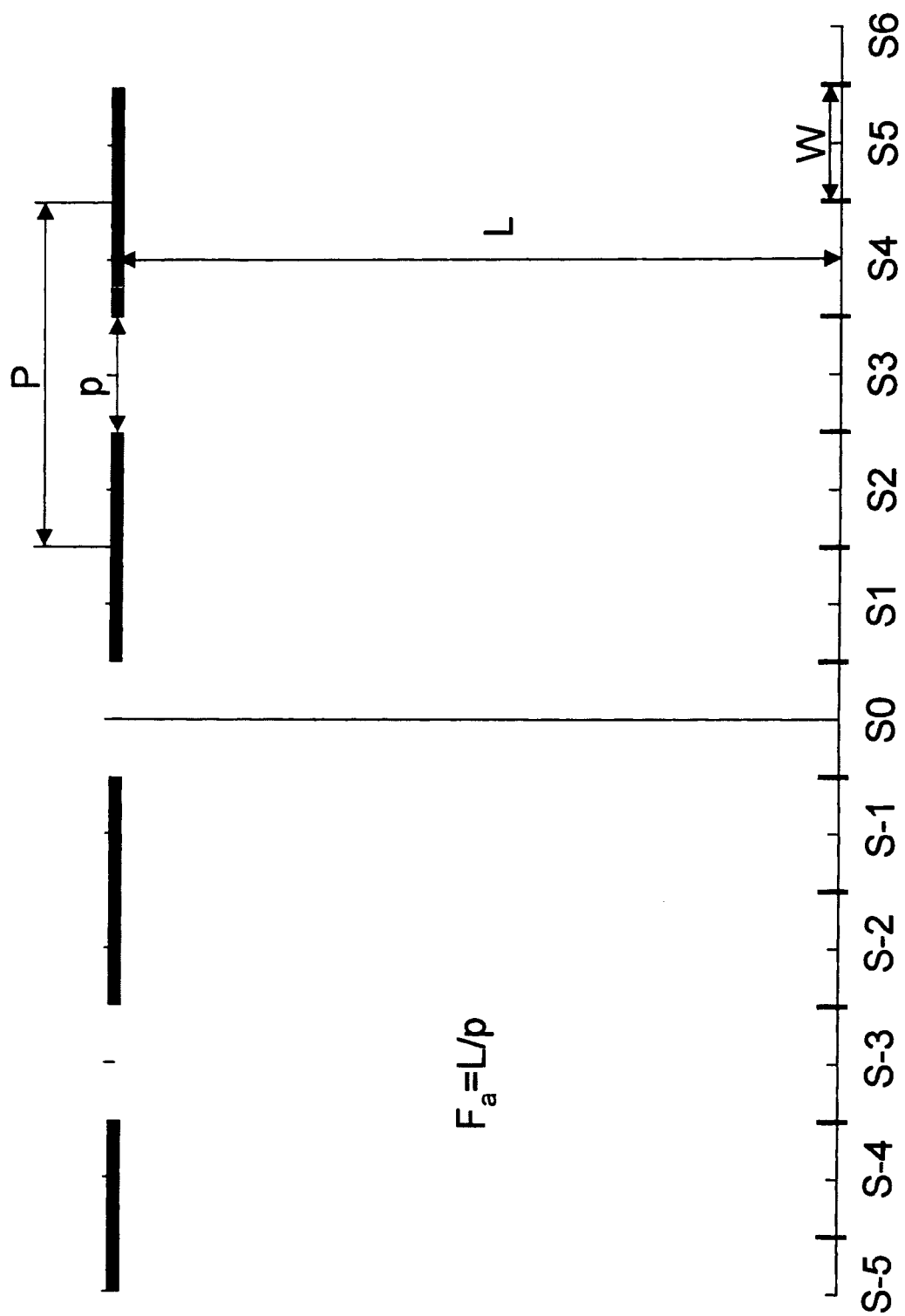
FIG. 3 is a diagram of an optical system using holes (pinholes) consistent with the present invention.

An optical system using the holes 15 consistent with the present embodiment will be compared with a conventional optical system using a lens with respect to the energy (brightness) of light incident on the imaging device with reference to FIGS. 2 and 3. FIG. 2 is a diagram of the conventional optical system using a lens. FIG. 3 is a conceptual diagram of the optical system using the holes (pinholes) 15 consistent with the present invention.

The F-number (focal length/diaphragm aperture diameter) of a lens in an imaging apparatus used in a digital still camera or a mobile phone is about 2.8. On the other hand, the F-number in the imaging apparatus consistent with the present embodiment is obtained by the following expression on the assumption that the diameter p of each hole 15 is 3 μm and the length L between the light shielding part 12 and the image surface of the imaging device 14 is 3 mm.

$Fa = L/p = 3000 \mu m / 3 \mu m = 1000$

Therefore, the ratio of the F-number of the lens, i.e., F=2.8 to that of the present embodiment, i.e., in the use of the holes 15 instead of a lens, is obtained by the following expression.

$F/Fa = 2.8/1000$

In this case, the ratio of energy of light incident on the imaging device in the case using the lens and that in the case of using the holes is as follows.

$(F/Fa)^2 = 0.00000784$

The reciprocal thereof is 127,551.

For example, when a device of which the pixel size is 3 μm, the number of pixels in the horizontal direction is 1,000, the number of pixels in the vertical direction is 1,000, and the total number of pixels is 1,000,000 is used as the imaging device 14. Therefore, the number of holes 15 is 127, 551 on condition that the energy of light incident on the imaging device 14 is equivalent to that in the optical system using the lens with F=2.8.

Therefore, in the example, about 100,000 holes 15 are formed in the light shielding part 12, thus obtaining the energy (brightness) of light equivalent to that of a conventional imaging apparatus used in a digital still camera or a mobile phone. According to the present embodiment, therefore, when the holes 15 corresponding to the total number of pixels of the imaging device 14 are formed, thus providing as much energy as the energy of light incident on the imaging device 14 and higher than that in an imaging apparatus used in a digital still camera or a mobile phone.

The description regarding the number of holes 15 is mentioned above. For the size of a hole formation region, where the holes 15 are formed in the light shielding part 12, in order to permit the beams of light to be incident on pixels in the periphery of an effective pixel region (pixels used for imaging information) of the imaging device 14 so as to provide energy equivalent to that of pixels in the center, the size of the region is larger than the effective pixel region of the imaging device 14. Preferably, the area ratio of the hole formation region to the effective pixel region is, e.g., 9:1.

The size of the hole formation area in the light shielding part 12 relative to the effective pixel region of the imaging device 14 also depends on the relationship between the angle of view of the imaging device 14 and the length L between the light shielding part 12 and the image surface of the imaging device 14. For instance, assuming that the effective pixel region is 3 mm (horizontal)×3 mm (vertical) and L=3 mm, when the angle of view is 90 degree, then the area of the hole formation region in the light shielding part 12 is nine times as large as the effective pixel region. Thus, the energy of light incident on the pixels in the effective pixel region can be substantially uniform.

As mentioned above, subject images are formed on the image surface of the imaging device 14 through the holes 15, so that the energy of light corresponding to the number of holes 15 can be obtained on the entire image surface. Therefore, the necessary amount of light can be obtained by arbitrarily setting the number of holes 15. However, the subject images are formed on the image surface such that the formed images are displaced relative to each other by a displacement amount corresponding to the pitch of the holes 15. The displacement between the subject images formed on the image surface is corrected by signal processing through the signal processing circuit 16.

The details of signal processing for correction of the displacement between the subject images through the signal processing circuit 16 is described below.

Figure 4:
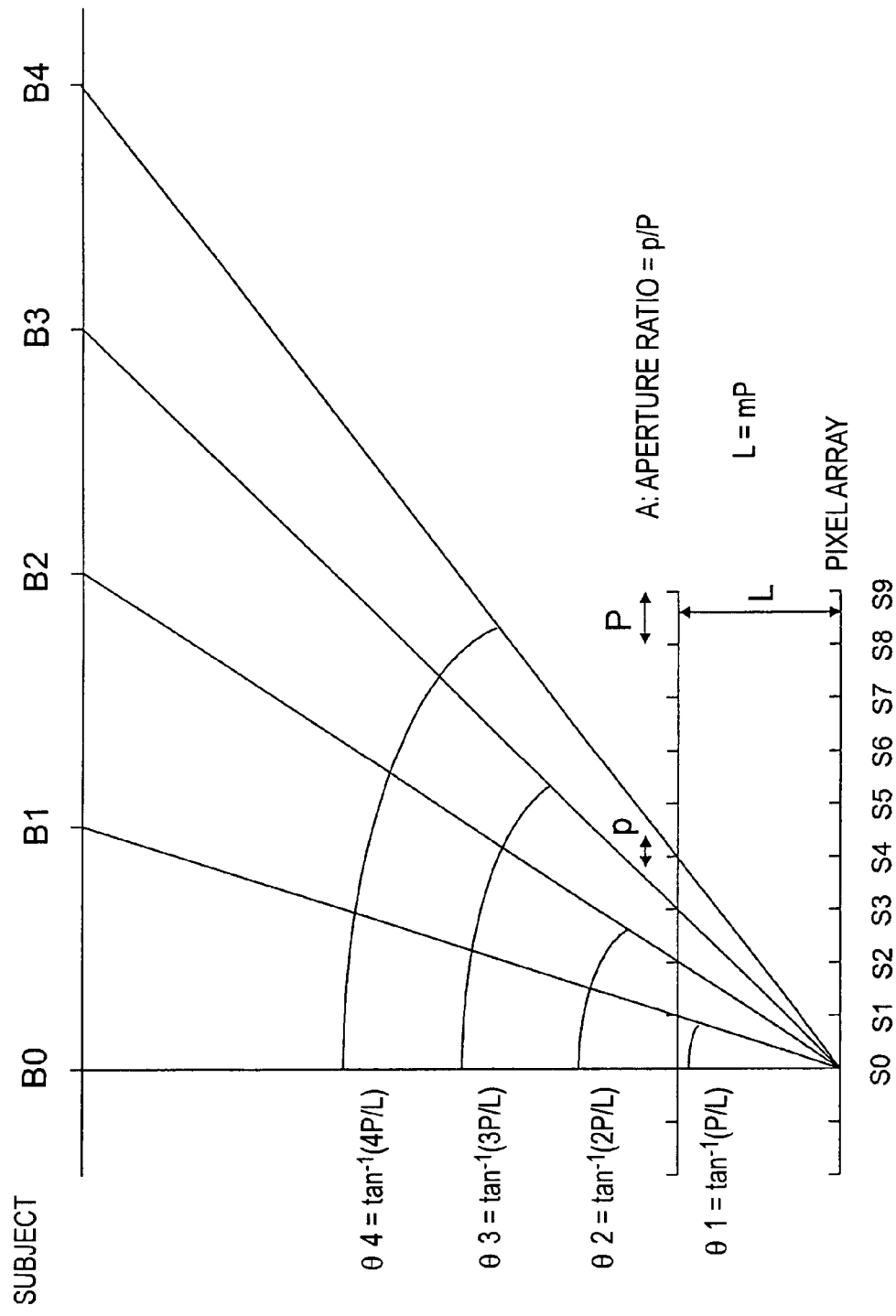
FIG. 4 is a diagram showing the relationship between a subject and the imaging apparatus using a one-dimensional model.

For illustration, a one-dimensional model as shown in FIG. 4 will be described as an example of the imaging device 14. In the one-dimensional model, pixels are arranged one-dimensionally. Referring to FIG. 4, reference symbol L denotes the length between the light shielding part 12 and the image surface of the imaging device 14, P denotes the pitch between the holes (pinholes) 15, p denotes the diameter of each hole 15, A denotes the aperture ratio (=p/P), and m denotes a coefficient. In this case, it is assumed that the pitch P is equal to the pitch between pixels.

Information Si supplied to a pixel (i denotes a pixel number) of the imaging device 14 is expressed by Expression 1.

$$S_i = \sum_{j=-N}^{N} k_{ij} B_j \quad \text{[Expression 1]}$$

$$\begin{pmatrix} S_{-N} \\ S_{-(N-1)} \\ S_i \\ S_N \end{pmatrix} = \begin{pmatrix} k_{-N-N} & k_{-N-(N-1)} & k_{-Nj} & k_{-NN} \\ k_{-(N-1)-N} & k_{-(N-1)-(N-1)} & k_{-(N-1)j} & k_{-(N-1)N} \\ k_{i-N} & k_{i-(N-1)} & k_{ij} & k_{iN} \\ k_{N-N} & k_{N-(N-1)} & k_{Nj} & k_{NN} \end{pmatrix}$$

$$\begin{pmatrix} B_{-N} \\ B_{-(N-1)} \\ B_i \\ B_N \end{pmatrix}$$

$i = -N, -(N-1), \ldots -1, 0, 1, 2, \ldots, N$ $j = -N, -(N-1), \ldots -1, 0, 1, 2, \ldots, N$ $k_{ij} = A \cos^2 \theta_{ij}$ where $k_{ij}$ is a coefficient defined by the pitch P between the holes 15 and the hole diameter p.

Information (light including visible light or electromagnetic radiation such as near infrared radiation, infrared radiation, or ultraviolet radiation) Bj from the subject 17 is obtained by arithmetic computations. If the information Si relates to the brightness of the subject 17, brightness information can be reproduced as the information Bj by arithmetic computations. When the information Si relates to the color of the subject 17, color information can be reproduced as the information Bj by arithmetic computations.

If there is brightness information alone, the brightness information Bj of the subject 17 can be calculated by arithmetic computations based on Expression 2. To reproduce the color of the subject 17, information pieces related to several kinds of colors such as red, blue, and green are obtained as output signals of pixels. Thus, color information of the subject 17 can be similarly obtained by arithmetic computations based on Expression 2.

$$B_j = f(S_i, k_{ij}) \qquad \text{[Expression 2]}$$

$$\begin{pmatrix} B_{-N} \\ B_{-(N-1)} \\ B_i \\ B_N \end{pmatrix} = \begin{pmatrix} k_{-N,-N} & k_{-N,-(N-1)} & k_{-Nj} & k_{-NN} \\ k_{-(N-1),-N} & k_{-(N-1),-(N-1)} & k_{-(N-1)j} & k_{-(N-1)N} \\ k_{i,-N} & k_{i,-(N-1)} & k_{ij} & k_{iN} \\ k_{N,-N} & k_{N,-(N-1)} & k_{Nj} & k_{NN} \end{pmatrix}^{-1} \begin{pmatrix} S_{-N} \\ S_{-(N-1)} \\ S_i \\ S_N \end{pmatrix}$$

$$i = -N, -(N-1), \ldots -1, 0, 1, 2, \ldots, N$$

$$j = -N, -(N-1), \ldots -1, 0, 1, 2, \ldots, N$$

$$k_{ij} = A\cos^2 \theta_{ij}$$

As approaches of obtaining color information as a pixel output signal, known color separating methods can be used. For example, a method for achieving color separation by a prism for the use of a 3-chip imaging system, a method using an on-chip color filter on an imaging device, a method for arranging color filters in holes 15, and a method for achieving color separation in a pixel portion of an imaging device can be used.

As mentioned above, the information Bj, obtained by arithmetic computations through the signal processing circuit 16, as brightness information or color information of the subject 17 is shown on a display, thus reproducing an image of the subject 17 as a one-dimensional image.

Figure 5:
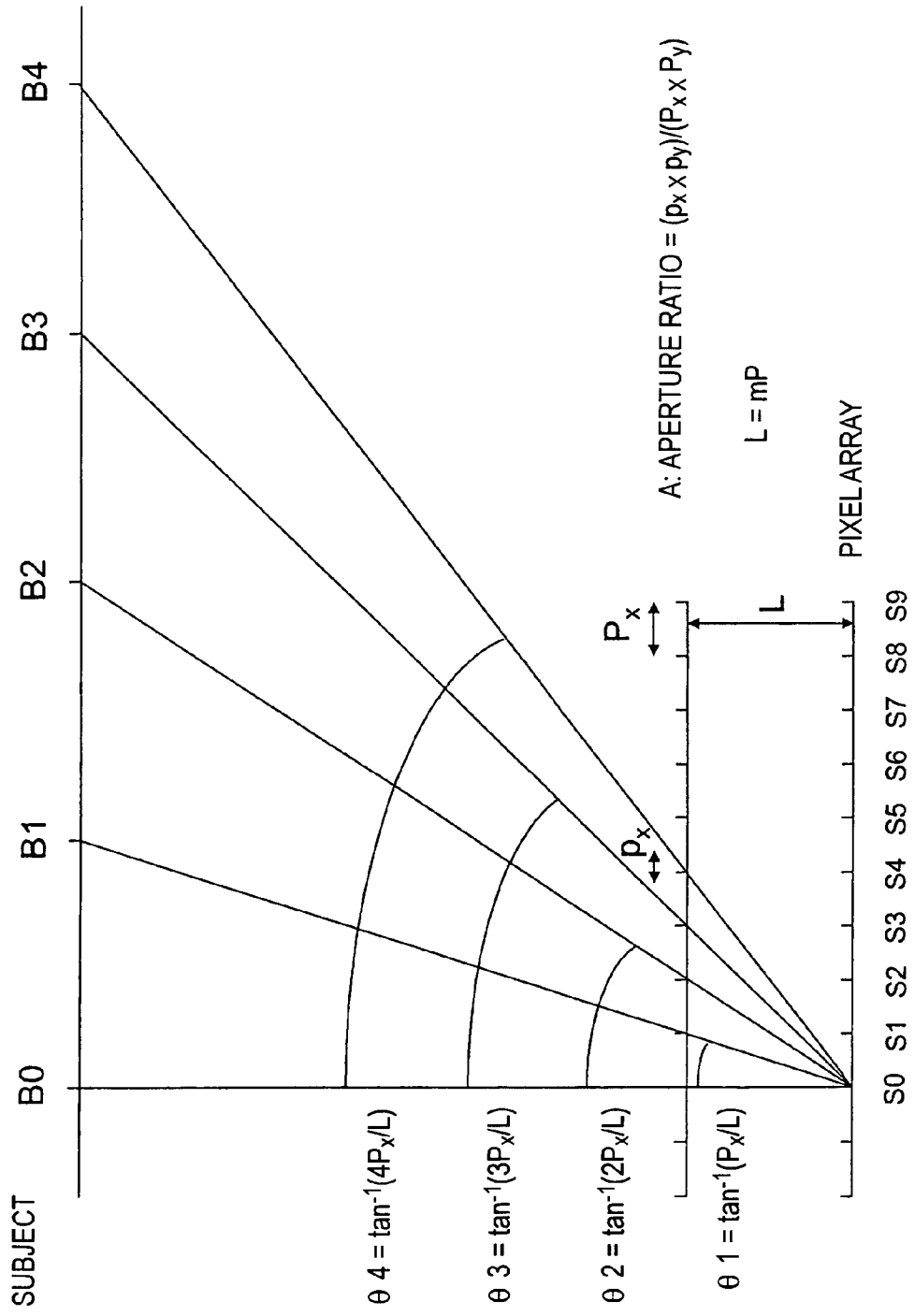
FIG. 5 is a diagram showing the relationship between a subject and the imaging apparatus using a two-dimensional model.
Figure 6:
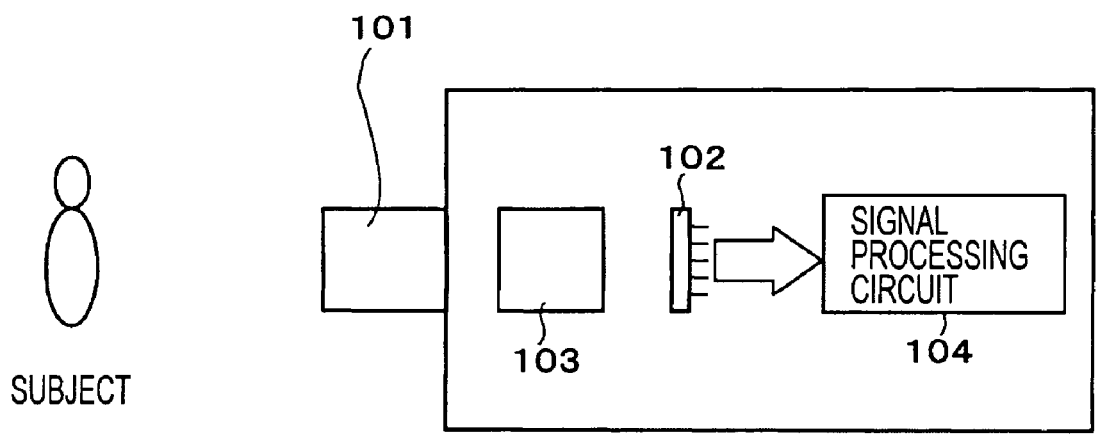
FIG. 6 is a diagram of the structure of an imaging apparatus using an imaging lens.

Illustratively, the one-dimensional model has been described above as an example. FIG. 5 shows a two-dimensional model. In the case of the two-dimensional model, Expression 3 and Expression 4 correspond to Expression 1 and Expression 2 for the one-dimensional model, respectively. The signal processing circuit 16 performs arithmetic computations according to those expressions to obtain information Bjk as brightness information or color information of the subject 17. When the information Bjk is shown on a display, an image of the subject 17 can be reproduced as a two-dimensional image.

$$S_{hi} = \sum_{j=-N, k=-M}^{N,M} k_{hijk} B_{jk} \qquad \text{[Expression 3]}$$

$$\begin{pmatrix} S_{-N,i} \\ S_{-(N-1),i} \\ S_{h,i} \\ S_{N,i} \end{pmatrix} = \sum_{k=-M}^{M} \left( \begin{pmatrix} k_{-N,i,-N,k} & k_{-N,i,-(N-1),k} & k_{-N,i,j,k} & k_{-N,i,N,k} \\ k_{-(N-1),i,-N,k} & k_{-(N-1),i,-(N-1),k} & k_{-(N-1),i,j,k} & k_{-(N-1),i,N,k} \\ k_{h,i,-N,k} & k_{h,i,-(N-1),k} & k_{h,i,j,k} & k_{h,i,N,k} \\ k_{N,i,-N,k} & k_{N,i,-(N-1),k} & k_{N,i,j,k} & k_{N,i,N,k} \end{pmatrix} \begin{pmatrix} B_{-N,k} \\ B_{-(N-1),k} \\ B_{i,k} \\ B_{N,k} \end{pmatrix} \right)$$

$$h = -N, -(N-1), \ldots -1, 0, 1, 2, \ldots, N$$

$$i = -M, -(M-1), \ldots -1, 0, 1, 2, \ldots, M$$

$$j = -N, -(N-1), \ldots -1, 0, 1, 2, \ldots, N$$

$$k = -M, -(M-1), \ldots -1, 0, 1, 2, \ldots, M$$

$$k_{hijk} = A\cos^2 \theta_{hijk}$$

where $k_{hijk}$ is a coefficient defined by the pitch P between the holes 15 and the hole diameter p.

$$B_{jk} = f(S_{hi}, k_{hijk}) \qquad \text{[Expression 4]}$$

where f is the inverse of the following.

$$\begin{pmatrix} S_{-N,i} \\ S_{-(N-1),i} \\ S_{h,i} \\ S_{N,i} \end{pmatrix} = \sum_{k=-M}^{M} \left( \begin{pmatrix} k_{-N,i,-N,k} & k_{-N,i,-(N-1),k} & k_{-N,i,j,k} & k_{-N,i,N,k} \\ k_{-(N-1),i,-N,k} & k_{-(N-1),i,-(N-1),k} & k_{-(N-1),i,j,k} & k_{-(N-1),i,N,k} \\ k_{h,i,-N,k} & k_{h,i,-(N-1),k} & k_{h,i,j,k} & k_{h,i,N,k} \\ k_{N,i,-N,k} & k_{N,i,-(N-1),k} & k_{N,i,j,k} & k_{N,i,N,k} \end{pmatrix} \begin{pmatrix} B_{-N,k} \\ B_{-(N-1),k} \\ B_{i,k} \\ B_{N,k} \end{pmatrix} \right)$$

$$h = -N, -(N-1), \ldots -1, 0, 1, 2, \ldots, N$$

$$i = -M, -(M-1), \ldots -1, 0, 1, 2, \ldots, M$$

$$j = -N, -(N-1), \ldots -1, 0, 1, 2, \ldots, N$$

$$k = -M, -(M-1), \ldots -1, 0, 1, 2, \ldots, M$$

$$k_{hijk} = A\cos^2 \theta_{hijk}$$

As mentioned above, subject images are formed on the image surface of the imaging device 14 through the respective holes 15 formed in the light shielding part 12 arranged opposite to the image surface of the imaging device 14. Electric signals, obtained from the subject images on the image surface of the imaging device 14 by photoelectric conversion, are subjected to signal processing to correct the displacement between the subject images formed on the image surface through the holes 15. Thus, the image of a subject can be captured without being out of focus at the desired amount of light by means of no imaging lens. This leads to a reduction in size, weight, and cost of the imaging apparatus.

Further, any imaging lens is not used, when a subject with a wide dynamic range is captured, the difference in signal charge between pixels of the imaging device 14 is small. Thus, the dynamic range of the imaging device 14 can be effectively utilized. In addition, since the present imaging apparatus with no lens has an appropriate structure, the amount of light incident on peripheral pixels can be prevented from decreasing.

The present embodiment has been explained on the assumption that the holes 15 are formed in the light shielding part 12 with a uniform pitch. It is not necessary to provide a uniform pitch. Pitches can be partially changed.

In the above embodiment, signal processing by the signal processing circuit 16 relates to the correction of the displacement between the subject images formed on the image surface through the holes 15. In addition to the above signal processing to correct the displacement to obtain an image of a subject, various other signal processing including subject motion sensing and subject identification can also be performed.

As described above, an imaging apparatus consistent with the present invention can capture the image of a subject without being out of focus at the desired amount of light. The apparatus of this embodiment includes no imaging lens. However, one may implement another lens means for some reason, for example, to raise a light sensing level. A reduction in size, weight, and cost of the imaging apparatus can be achieved. In shooting a subject with a wide dynamic range, the dynamic range of an imaging device can be effectively used because the difference in signal charge between pixels of the imaging device is small.

An imaging apparatus according to the present embodiment can be used by itself as a general camera such as a digital still camera or a camera module. Since the size, weight, and cost of the apparatus can be reduced, the apparatus as an imaging device can be incorporated into a compact portable device such as a mobile phone. This greatly contributes to the reduced size, weight, and cost of the compact portable device.

What is claimed is:

1. An imaging apparatus comprising:
   an imaging device which converts subject images formed on an image surface into image signals;
   an image forming portion comprising a plurality of holes, formed in a light shielding part arranged opposite to the image surface of said imaging device; and
   a signal processing portion which processes the image signals from said imaging device to correct the displacement between the subject images formed on the image surface through the holes,
   wherein,
   said signal processing portion performs arithmetic computations on the image signals from respective pixels of said imaging device using a coefficient based on a pitch between the holes and a diameter of the hole and brightness information.

2. The apparatus according to claim 1, wherein the size of a hole formation region where the holes are formed is larger than that of an effective pixel region of said imaging device.

3. An imaging method comprising the steps of:
   forming subject images on an image surface of an imaging device through a plurality of holes formed on a light shielding part arranged opposite to a image surface of the imaging device; and
   processing image signals obtained from the subject images on the image surface by photoelectric conversion through the imaging device to correct the displacement between the subject images formed on the image surface through the holes,
   performing arithmetic computations on the image signals from respective pixels by a signal processing portion of said imaging device which uses a coefficient based on a pitch between the holes and a diameter of the hole and brightness information.

* * * * *